April 7, 1931.  J. M. HERIDER  1,800,181
STUMP GROOVING MACHINE
Filed Dec. 5, 1929
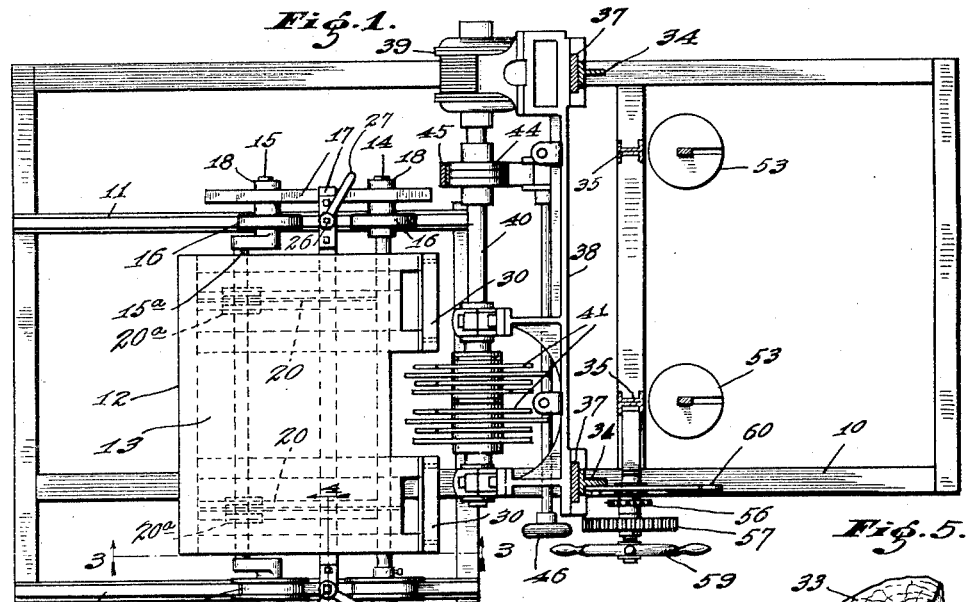
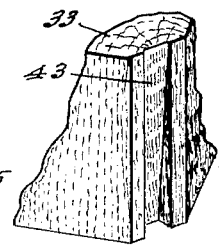
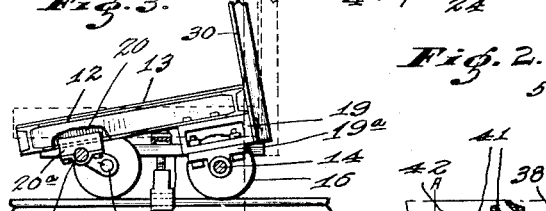
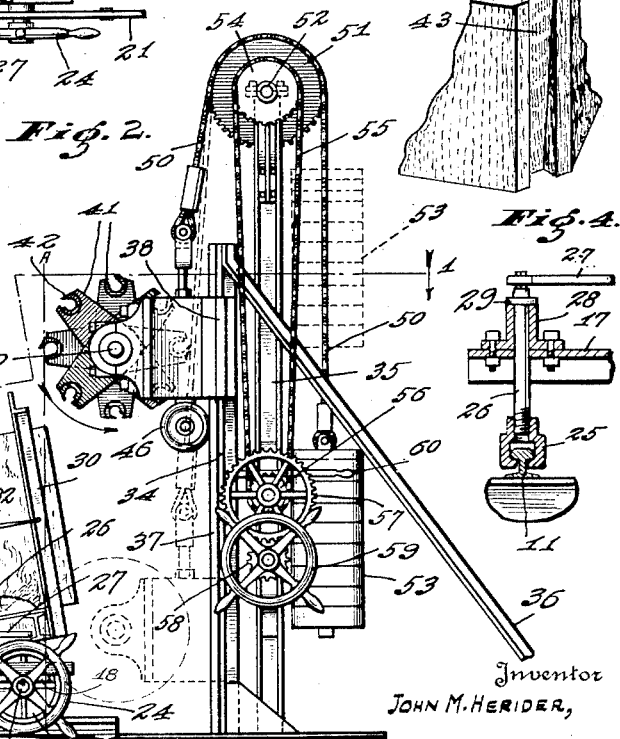
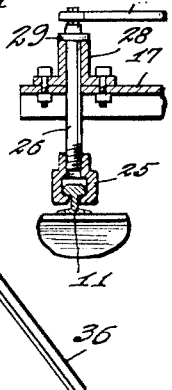
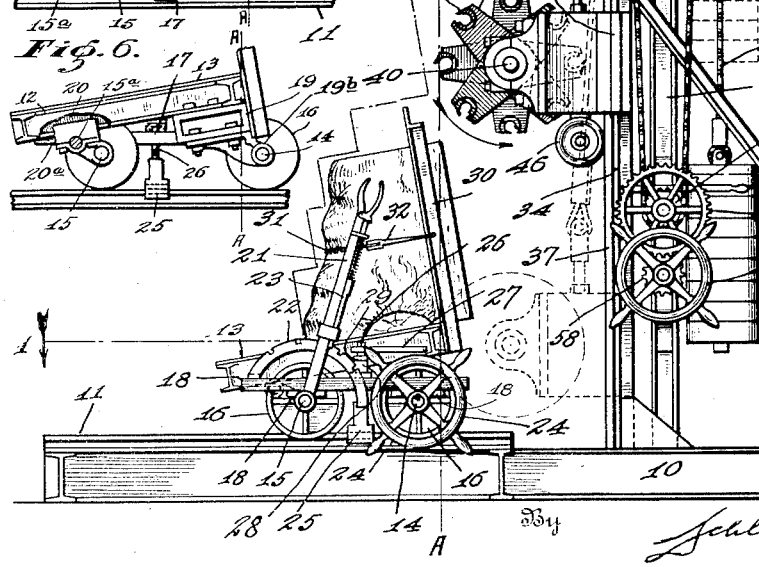
Inventor
JOHN M. HERIDER,
Attorneys Patented Apr. 7, 1931

1,800,181

UNITED STATES PATENT OFFICE

JOHN M. HERIDER, OF INDIANAPOLIS, INDIANA, ASSIGNOR TO THE SINKER-DAVIS CO., OF INDIANAPOLIS, INDIANA, A CORPORATION OF INDIANA

STUMP-GROOVING MACHINE

Application filed December 5, 1929. Serial No. 411,737.

In the making of certain of the finer veneers, the stumps of large trees are used, and the sheets of veneering are sliced circumferentially therefrom. In such slicing of the veneering sheets, the stumps are first cut into sections, commonly halves, and mounted on a rotating member or "back-log" so that the slicing cut follows in general the natural outer shape of the stump. As the stump is ordinarily larger at one end than at the other, and as for the best graining and largest yields it is desirable to follow this generally-tapering surface, this desirably involves mounting the stump section which is being sliced on the rotating member or "back-log" so that the axis of the tree trunk is oblique to the axis of rotation.

In order to get this obliqueness, the flat face of the stump section, as of the stump-half, is provided with a central longitudinal channel or groove the bottom of which is oblique with respect to the tree-axis. This channel or groove is arranged to receive the "back-log" of the veneer-cutting machine, and the base of such channel or groove bears against such "back-log" and determines the obliqueness of the rotating stump section.

The obliqueness of the bottom of the channel or groove with respect to the tree axis is varied to correspond with the shape and general slope of the outer surface of the stump, according to the judgment of the veneer-maker.

It is the object of my present invention to provide a simple and effective machine for cutting such grooves or channels, and for controlling the depths and varying the obliqueness thereof easily and effectively.

My invention is illustrated in the accompanying drawing. In such drawing, Fig. 1 is a horizontal section through a stump-grooving machine embodying my invention, the section being taken substantially on the line 1—1 of Fig. 2 so that most of the structure is shown in plan; Fig. 2 is a side elevation of the machine shown in Fig. 1; Fig. 3 is a vertical section on the line 3—3 of Fig. 1, to show the tiltable platform of the stump-carrying truck or carriage; Fig. 4 is a vertical transverse section through the truck-locking device, being taken substantially on the line 4—4 of Fig. 1; Fig. 5 is a fragmentary perspective of a stump section in which an oblique groove has been made by my machine; and Fig. 6 is a view similar to Fig. 3, to show a modified form of tiltable-platform truck designed to increase stability.

The base 10 of the machine is provided with a pair of parallel track rails 11, on which a truck or a carriage 12 is mounted. This truck 12 has a platform 13 which is supported by two axles 14 and 15, each axle having a pair of wheels 16 which rest on the track rails 11. At least one of each pair of wheels 16 is flanged, though the other of that pair may be unflanged.

The axle 14 and the outer ends of the axle 15 are in fixed relation to each other by being interconnected by a sub-frame 17, co-operating through suitable bearings 18 with the outer ends of both axles. The axle 14 is a straight axle, and its location is fixed with relation to the platform 13 by a pair of rigid bolsters 19 and bearing-blocks 19$^a$ or 19$^b$ (see Figs. 3 and 6) fastened to the platform 13 near one end thereof. The axle 15, however, is not a straight axle, but instead is provided with an eccentric middle portion or crank 15$^a$, on which the rear end of the platform 13 is supported. To this end the platform 13 is desirably provided with T-shaped side-bars 20 on which bearing-blocks 20$^a$ for the crank or eccentric portion 15$^a$ are slidable forward and back along the under side of the platform 13. The wheels 16 on the cranked axle 15 are loose, and that axle at one end has fixed thereto an adjusting arm 21 by which it may be adjusted around the axis of the wheels 16. The adjusting arm 21 co-operates with a notched segment 22, mounted on the sub-frame 17; and has a releasable spring-pressed locking key 23 in the usual manner of adjusting arms which co-operate with notched segments, to hold the arm 21 and therefore the axle 15 in any adjusted position. By manipulating the adjusting arm 21, and thus turning the cranked axle 15 about the axis of the wheels 16, the crank or eccentric portions 15$^a$ of such axle is moved in an arc about such axis, and in consequence is raised or lowered. This produces an adjustable tilting of the platform 13, as is clear from the full and dotted lines of Fig. 3.

The straight axle 14 desirably has one or both of its wheels fixed thereon, and is provided with an adjusting wheel 24 by which it may be turned. By reason of this arrangement, turning of the wheel 24 turns the axle 14, and at least one of its associated wheels 16; and the wheels 16 roll on the track rails 11 to shift the carriage 12 as a whole along such track rails to any desired location.

In order to hold the carriage 12 in such desired location on the track rails 11, I desirably provide some form of locking device. This may take the form of a clamping shoe 25 which embraces the head of one of the rails 11 (see Fig. 4) and has a screw 26 in its upper portion. The screw 26 is mounted in the sub-frame 17, in a block 28 fixed on said sub-frame, and is provided with a squared upper end for receiving a wrench or operating handle 27; and has a collar 29 by which it bears on the top of the block 28. By operating the handle 27, and through it the screw 26, the truck may be clamped down upon the rail 11 by the clamping action between the inwardly extending fingers at the bottom of the shoe 25 and the down-pressing collar 29 on the screw 26; and this clamping may be released when desired by reverse operation of the handle 27.

This locking device may be provided on each side of the truck if desired, as shown; but sometimes it is sufficient to provide it on only one side thereof. Desirably the handle 21, the adjusting wheel 24, and at least one handle 27 are all on the same side of the machine, for convenient operation by one man.

The platform 13 is provided at its forward end with a pair of uprights 30, between which there is a space which extends down through the forward edge of the platform. The uprights 30 are provided with suitable openings for receiving the ends of one or more clamping chains 31, which desirably have turnbuckles 32 or other adjusting devices, by which stump sections 33 of varying sizes and shapes may be clamped against the uprights 30 and upon the platform 13. The stump sections are so clamped with their flat axial faces produced by the halving or other sectioning clamped against the uprights 30, and with their larger end faces resting on the platform 13, as is clear from Fig. 2. After being so clamped, the location and tilting of the stump is adjusted by the hand wheel 24 and by the handle 21; and when the desired positioning of the stump is obtained the truck is clamped in place by manipulating the handle 27.

The base 10 is provided with two upright frames 34 and 35. The upright frame 34 which desirably has oblique braces 36, and provides a pair of parallel vertical slide bars 37 on which a vertically adjustable sub-frame 38 is mounted. This vertically adjustable sub-frame carries a shaft 40 mounted in suitable bearings on such adjustable sub-frame. This shaft 40 may be driven in any suitable manner that permits the vertical movement of said shaft and the sub-frame which carries it; but I prefer a direct-drive, by a suitably controlled electric motor 39, as shown. The shaft 40 carries a rotary cutter, shown as a group of cutting knives 41 each desirably having a cutting tooth 42 at each end. The cutting knives 41 are desirably mounted in different angular positions on the shaft 40, and as a whole are of a width equal to that of the desired channel 43 which is to be cut in the face of the stump section 33. The group of knives 41 lie between the two uprights 30 of the carriage, as considered longitudinally of the shaft 40, so that they register with the opening between said two uprights and the opening in the forward edge of the platform 13. The shaft 40 desirably has a brake disk 44 thereon co-operating with a brake band 45 which may be set by a brake-setting wheel 46 carried by the sub-frame 38.

The vertically adjustable sub-frame 38 is hung from a pair of chains 50, which pass over sprockets 51 on a shaft 52 suitably mounted at the upper end of the upright frame 35 and are provided with counterweights 53 of such weight that they substantially balance the weight of the vertically adjustable sub-frame 38 and the parts carried thereby. The sprockets 51 are fixed to the shaft 52, which also has fixed to it a sprocket 54. An endless chain 55 connects the sprocket 54 to a sprocket 56 suitably rotatably mounted at a convenient height on one side of the upright frame 35. Rigid with the sprocket 56 is a gear 57, which meshes with a pinion 58 rigid with an adjusting hand-wheel 59 also mounted on the side of said upright frame 35. Manipulation of the hand-wheel 59 acts through the gears 58 and 57, the sprockets 56 and 54, and the chain 55, to turn the shaft 52; which in turn operates the sprockets 51 and chains 50 to raise or lower the vertically adjustable sub-frame 38 and the parts carried thereby. If it is desired to hold the sub-frame 38 in any position, this may be done by an arm 60 pivoted on the upright frame 34 and co-operating with a gear rigid with the sprocket 56 and gear 57.

The brake-setting wheel 46 and the adjusting hand-wheel 59 are desirably on the same side of the machine as are the adjusting arm 21, the hand-wheel 24, and a clamping handle 27, so that all these parts may conveniently be controlled by the same operator.

In operation, a stump section 33 is mounted on the platform 13, and fastened in place against such platform to the uprights 30 by the clamping chains 31. Then the hand wheel 24 is turned to move the carriage forward or backward to get the stump-section to the desired position with relation to the vertical plane of travel of the knives 41; and the arm 21 is adjusted to tilt the stump 33 to give the desired obliqueness to the channel or groove 43 which is about to be cut. Both of these adjustments are made in accordance with the judgment of the operator. When they are made, the stump section is held in the desired tilted position by the locking key 23, and the carriage is held against accidental forward or backward movement by setting the clamping screw 26 by its handle 27. Then the shaft 40 is started, as by starting its driving motor 39 if it is direct-driven, to drive the knives 41; which rotate so that they cut on their downward stroke. Then the operator turns the hand wheel 59 clockwise, which causes the shaft 52 to turn counterclockwise. This lowers the sub-frame 38 and the parts carried thereby, with the knives 41 rotating, and produces the desired cutting of the channel 43. The bottom of such channel 43 is thus vertical, parallel to the motion of the sub-frame 38, but is oblique to the axis of the stump by reason of the aforesaid tilting. Ordinarily the channel 43 may be obtained with a single cut.

When the channel 43 has been cut, the stump section 33 is removed, and taken to the veneer-cutting machine, for fastening to the "back-log" thereof; and a new stump section is put on the carriage 12, which is now re-adjusted as necessary to suit such new stump section. The adjustment for different stump sections is obtained easily and simply, and the whole operation may be controlled by a single operator.

The bearing blocks by which the straight axle 14 is associated with the bolsters 19 may be either as shown in Fig. 3 or as shown in Fig. 6. If the bearing blocks 19ª are used as shown in Fig. 3, the vertical plane A to which the knives 41 cut is not between the two axles, but the knives clear both axles. On the other hand, if great stability is desired, the bearing blocks 19ᵇ of Fig. 6 are used, which causes the vertical cutting plane A and the downward forces exerted therein to lie between the two axles so that any upsetting tendency is avoided.

I claim as my invention:—

1. A stump-grooving machine comprising a main frame, a rotary cutter rotatable on a horizontal axis and vertically movable as a unit, and a stump-carrying truck movable toward and from the vertical plane in which said cutter is movable, and having a stump-carrying platform which is adjustably tiltable with respect to the plane of truck movement.

2. A stump-grooving machine comprising a main frame, a rotary cutter rotatable on a horizontal axis and vertically movable as a unit, and a stump-carrying truck movable toward and from the vertical plane in which said cutter is movable and lockable in adjusted position, and having a stump-carrying platform which is adjustably tiltable with respect to the plane of truck movement.

3. A stump-grooving machine comprising a main frame, a rotary cutter rotatable on a horizontal axis and vertically movable as a unit, and a stump-carrying truck movable toward and from the vertical plane in which said cutter is movable and having a stump-carrying platform which is adjustably tiltable with respect to the plane of truck movement, and means for locking the stump-carrying platform in tilted position.

4. A stump-grooving machine, comprising a supporting frame having an upright portion, a sub-frame vertically movable on said upright portion, a motor and a rotary cutter driven by said motor on said vertically movable sub-frame, said frame having a track extending transversely of the plane of vertical movement of said sub-frame, and a plural-axle carriage mounted on said track, said carriage having a platform which is tiltable with respect to the plane of the axles, and means for fastening a stump-section in position on said platform.

5. A stump-grooving machine, comprising a frame, a plural-axle stump-carrying truck on said frame, said truck having a platform which is pivoted on one of said axles, another of the axles of said truck having an adjustable eccentric portion on which said platform rests at a location removed from the first axle to produce tilting of said platform around the axis of the first axle, means for turning the first axle to shift said truck as a unit along said frame, and a rotatable cutter vertically movable as a unit to co-operate with a stump carried on said tiltable and adjustable truck.

6. A stump-grooving machine, comprising a frame, a plural-axle stump-carrying truck on said frame, said truck having a platform which is pivoted on one of said axles, another of the axles of said truck having an adjustable eccentric portion on which said platform rests at a location removed from the first axle to produce tilting of said platform around the axis of the first axle, and a rotatable cutter vertically movable as a unit to co-operate with a stump carried on said tiltable and adjustable truck.

7. A stump-grooving machine, comprising a frame, a plural-axle stump-carrying truck on said frame, said truck having a platform which is pivoted on one of said axles, another of the axles of said truck having an adjustable eccentric portion on which said platform rests at a location removed from the first axle to produce tilting of said platform around the axis of the first axle, means for locking said platform in adjusted position, and a rotatable cutter vertically movable as a unit to co-operate with a stump carried on said tiltable and adjustable truck.

8. A stump-grooving machine, comprising a frame having an upright portion, a sub-frame vertically movable on said upright portion, means for counterweighting said sub-frame, a rotary cutter and means for driving it mounted on said sub-frame, and a stump-carrying truck adjustable toward and from the plane of vertical movement of said cutter and provided with a tiltably adjustable platform.

9. A stump-grooving machine comprising a main frame, a rotary cutter rotatable on a horizontal axis and vertically movable as a unit, and a truck movable toward and from the vertical plane in which said cutter is movable, said truck having a stump-carrying platform which is adjustably tiltable to vary the angle between the plane of the carrying face of said platform and said vertical plane.

10. A stump-grooving machine comprising a main frame, a rotary cutter rotatable on a horizontal axis and vertically movable as a unit, and a wheeled truck movable toward and from the vertical plane in which said cutter is movable, said wheeled truck having a stump-carrying platform which is adjustably tiltable to vary the angle between the plane of the carrying face of said platform and said vertical plane, and means for locking the truck in adjusted position.

11. A stump-grooving machine comprising a main frame, a rotary cutter rotatable on a horizontal axis and vertically movable as a unit, a truck movable toward and from the vertical plane in which said cutter is movable, said truck having a stump-carrying platform which is adjustably tiltable to vary the angle between the plane of the carrying face of said platform and said vertical plane, and means for locking the stump-carrying platform in tilted position.

In witness whereof, I have hereunto set my hand at Indianapolis, Indiana, this 2d day of December, A. D. one thousand nine hundred and twenty-nine.

JOHN M. HERIDER.